United States Patent [19]

Dombrowski et al.

[11] 3,948,124
[45] Apr. 6, 1976

[54] APPARATUS AND METHOD FOR SEVERING STATOR END TURNS

[75] Inventors: Frank R. Dombrowski, Kingston; Frank R. Kuzan, De Kalb; Raymond L. Larson, Sycamore, all of Ill.

[73] Assignee: General Electric Company, Fort Wayne, Ind.

[22] Filed: Jan. 17, 1975

[21] Appl. No.: 541,740

[52] U.S. Cl. .................. 83/34; 29/403; 29/559; 269/52; 269/63; 83/54; 83/167; 83/184; 83/188; 83/267; 83/411 R; 83/412; 83/925 R
[51] Int. Cl.² .... B26D 1/04; B26D 1/12; B26D 3/00
[58] Field of Search .......... 29/403, 559; 269/52, 63, 269/47; 83/34, 35, 36, 39, 49, 54, 167, 181, 184, 188, 411 R, 412, 414, 907, 925 R, 733, 267, 452

[56] References Cited
UNITED STATES PATENTS

| | | | |
|---|---|---|---|
| 2,723,443 | 11/1955 | McKibben | 83/452 X |
| 3,204,501 | 9/1965 | Lane | 83/184 X |
| 3,698,273 | 10/1972 | Richard et al. | 83/188 X |
| 3,835,744 | 9/1974 | Wendt | 83/267 |
| 3,844,188 | 10/1974 | Williams | 83/54 X |

Primary Examiner—Donald R. Schran
Assistant Examiner—W. D. Bray
Attorney, Agent, or Firm—Joseph E. Papin

[57] ABSTRACT

Apparatus for severing from a plurality of windings in a dynamoelectric machine stator a generally annular grouping of winding end turns extending from an end face of the stator. The apparatus has means movable generally in a predetermined plane for severing at least a portion of the winding end turns from the stator windings. Means for mounting the stator includes means for positioning the end face generally adjacent the predetermined plane and also means for supporting the winding end turns portion adjacent the end face and the plane upon the severance of the winding end turns portion in response to the movement of the severing means into severing engagement therewith.

A method for severing the end turns from the stator winding, a method of mounting the stator having end turns adapted to be severed, and means for mounting a stator in apparatus for severing end turns from windings of the stator are also disclosed.

39 Claims, 3 Drawing Figures

APPARATUS AND METHOD FOR SEVERING STATOR END TURNS

BACKGROUND OF THE INVENTION

This invention relates generally to salvaging dynamoelectric machine components and in particular to an apparatus and a method for severing from windings in a dynamoelectric machine stator end turns thereof, a method of mounting such stator with respect to a predetermined plane along which such winding end turns are adapted to be severed, and means for mounting such stator in apparatus for severing such winding end turns.

Dynamoelectric machines, such as an electric motor or the like, are provided with a stator having a pair of opposite and generally parallel end faces intersected by a bore extending generally axially therebetween through the stator. A plurality of winding receiving slots are also provided in the stator about the bore thereof and intersecting with both the bore and the opposite end faces. A plurality of stator windings generally respectively constituted by a preselected number of turns of copper or aluminum wire or the like are wound or otherwise inserted by means well-known to the art into the stator winding slots. In this manner, opposite sides of the winding turns are disposed within the winding slots, and opposite ends of the winding turns span across a selected number of winding slots adjacent the intersections thereof with the opposite end faces exteriorly of the stator. These opposite ends of the winding turns are respectively formed into generally annular groupings extending from the opposite end faces radially outwardly of the stator bore and are known to the art as end turns. Of course, if desired, the particular wire of the windings may have an insulating coating thereon, and slot liners and wedges may be provided within the stator slots for insulation between the windings and the stator are material, as well-known in the art. Further, in some instances, the stators may be assembled by various means and methods generally known in the art as bonding. For a detailed discussion of one such bonded stator and method of assembly thereof reference may be had to U.S. Pat. No. 3,490,143 and Reissue of U.S. Pat. No. 26,788.

In the past, wound stators, such as described above, which were found to be defective for one reason or another either at the time of manufacture or after usage, were stripped of their windings. In this manner, salvaged stators which were in condition for reuse were rewound, and those which could not be reused were sold for scrap. Of course, the stripped windings could not be salvaged and were sold for scrap. In some cases, the entire wound stator may have been sold for scrap, but due to the formidable increases in the cost of stator core material, it is now more economically prudent to salvage stators for reuse if possible.

Various apparatus and methods have been employed in the past to sever end turns from the windings of a wound stator. Of course, one of the more widely used of such methods usually employed in smaller motor repair shops was to cut the end turn from the stator windings by the manual use of a hacksaw or the like. A disadvantageous or undesirable feature of this past method for severing end turns is readily apparent in that it was too time consuming so as to be unsuitable for use in salvaging stators on a production line basis. Another disadvantageous or undesirable feature was that a slight miscalculation or slippage of the hacksaw may blemish or nick the stator end face or even sever a portion of the stator end face thereby to render it unsalvagable.

In other past apparatus and methods for severing end turns from stator windings, a wound rotor was leveled on a table by inserting shims or blocks between one end face of the stator and the table, and the stator was then clamped in its leveled position to the table by a suitable adjustable clamping arrangement. A circular power saw was thereafter adjustably located generally axially of the stator and lowered to a cutting plane generally adjacent the upper end face of the stator. The power saw was then swung about adjustable supporting arms therefor in its cutting plane into severing or cutting engagement with the generally annular end turn to sever it from the stator winding. One of the disadvantageous or undesirable features of this past apparatus and method was that too much time and too many operations were involved in leveling the wound stator, then clamping it, then moving the power saw generally axially of the stator, and then adjusting the power saw to the desired cutting plane thereof. Another disadvantageous or undesirable feature of such past apparatus and method was that if the proper cutting plane of the cutting saw was not properly adjustably ascertained and maintained, the power saw would cut into the stator thereby to render it unsalvagable.

SUMMARY OF THE INVENTION

Among the several objects of the present invention may be noted the provision of an apparatus and a method for severing an end turn from windings of a dynamoelectric machine stator, a method of mounting such stator with respect to a predetermined plane along which such winding end turns are adapted to be severed, and means for mounting such stator in apparatus for severing such winding end turns which overcome the disadvantageous or undesirable features discussed hereinabove, as well as others, with respect to the past apparatus and methods; the provision of such apparatus and severing method which are generally automatic in nature; the provisions of such mounting means and mounting methods in which a wound stator is predeterminately and automatically located merely by manual assembly to such mounting means; the provision of such apparatus and severing methods in which a wound stator is predeterminately located in a mounting position to effect the subsequent severance of an end turn thereof upon the mounting assembly of the stator to the apparatus; the provision of such apparatus and methods in which the wound stator is intermittently indexed to successive positions in which successive portions of the end turn is severed from the stator windings until such severance is complete; the provision of such apparatus and methods in which means for severing the end turn from the stator winding is movable generally in a predetermined plane; the provision of such apparatus and methods in which means is provided for automatically locating the stator end face and the end turn to be severed relative to the predetermined plane of the severing means; the provision of such apparatus, such severing mounting methods and such mounting means in which the end turns of the stator winding is supported during the severance thereof; the provision of such apparatus and such mounting means which may be simply retooled to accommodate stators of various sizes; and the provision of such apparatus which is simplistic in design, economically and simply operated, and easily manufactured and assembled. Other objects and advantageous features will be in part apparent and in part pointed out hereinafter.

In general and in one form of the invention, apparatus is provided for severing from a plurality of windings in a dynamoelectric machine stator a generally annular grouping of the winding end turns extending from an end face of the stator. The apparatus has means movable generally in a predetermined plane for severing at least a portion of the winding end turns from the stator windings. Means is provided for mounting the stator including means for positioning the end face generally adjacent the predetermined plane and also means for supporting the winding end turns adjacent the end face and the plane upon the severance of the winding end turns portion in response to the movement of the severing means into severing engagement therewith.

Also in general, apparatus in one form of the invention is provided for severing from a plurality of windings disposed within a dynamoelectric machine stator generally about a bore thereof a generally annular grouping of winding end turns extending from an end face of the stator. The apparatus has means reciprocally movable generally in a predetermined plane for severing the end turns from the windings and also means for mounting the stator proximate to the severing means. The mounting means includes means for aligning the stator wherein the end face is generally parallel to the predetermined plane, means for positioning the end face generally adjacent the predetermined plane, and also means for supporting the end turns disposed generally normally to the predetermined plane between it and the end face. At least a portion of the end turns is urged toward engagement with the supporting means in response to the severing engagement of the severing means with the end turns portion upon the reciprocal movement in one direction of the severing means from an at-rest position thereof generally toward the axis of the stator bore.

Further in general and yet in one form of the invention, apparatus is provided for severing from a plurality of windings disposed generally about a bore of a dynamoelectric machine stator a generally annular grouping of end turns of the windings extending exteriorly of the stator from an end face thereof. The apparatus has a base, and a fixture mounted to the base. A cutter bar is reciprocally movable in the fixture and has a generally arcuate cutting edge, and means in the fixture is provided for guiding engagement with the cutter bar to maintain the path of the reciprocal movement thereof generally in a predetermined plane. A pair of parallel spaced apart shafts are rotatably mounted to the base, and one of the shafts is disposed proximate to the cutter bar on an axis intercepting the path of the reciprocal movement of the cutter and extending generally normally to the predetermined plane. A pair of gears is mounted to the shafts in meshing engagement therebetween, and a third gear is mounted to the other of the shafts. A rack is meshed with the third gear, means is provided for intermittently advancing the rack to conjointly drive the third gear, the other shaft and the gear pair for effecting intermittent rotation of the one shaft between a plurality of intermittent indexed positions. Means is provided for mounting the stator which is adapted to be manually assembled thereto, and the mounting means is carried on the one shaft and adapted for concerted rotation therewith between its indexed positions. The mounting means includes a mounting head having a plurality of generally radially extending flanges with free end surfaces for guiding engagement with portions of the stator within the bore thereof to position the stator end face generally parallel with the predetermined plane and also a support for seating the stator on the mounting means. The support includes a sloped generally annular surface for positioning the stator end face generally adjacent the predetermined plane and for engagement with the stator about the bore thereof at least adjacent the end face and also a generally cylindric abutment surface for supporting engagement with the end turns and extending generally normally to the predetermined plane between it and the stator end face. At least a portion of the end turns is urged toward engagement with the abutment surface in response to the severing engagement of the cutting edge with the end turns portion upon the reciprocal movement in one direction of the cutter bar from an at-rest position generally toward the axis of the one shaft when it is in each of its indexed positions.

Still further in general, a method in one form of the invention is provided for severing a winding end turn extending from an end face of a dynamoelectric machine stator and formed by a plurality of windings wound in the stator. In this severing method, the stator is assembled to means for mounting it in a position predeterminately disposing the winding end turn adjacent means for severing it, and the severing means is actuated into severing engagement with a portion of the winding end turn and severs the winding end turn portion from the windings in the stator. The mounting means with the stator assembled thereto is thereafter indexed toward successive indexed positions, and the severing means is further actuated to respectively sever other portions of the winding end turn in the successive indexed positions of the mounting means and stator until the winding end turn is severed from the windings in the stator.

In general and in apparatus for severing a generally annular grouping of end turns of windings in a dynamoelectric machine stator generally in a predetermined severing plane, means is provided in one form of the invention for mounting the stator upon the assembly thereof to the mounting means. The mounting means includes means for predeterminately locating the stator so that the severing plane passes through the winding end turns closely adjacent the stator and also means disposed between the stator and the severing plane and generally normal thereto for supporting engagement with the winding end turns.

Also in general and in one form of the invention, a method is provided for mounting a dynamoelectric machine stator having a generally annular grouping of winding end turns extending from an end face thereof with respect to a predetermined plane along which winding end turns are adapted to be severed. In this mounting method, means for supporting engagement with the winding end turns is located adjacent the predetermined plane and generally normal thereto, and the stator is assembled to means for mounting it wherein the end face is closely adjacent the predetermined plane and the winding end turns extend therethrough about the supporting engagement means therefor.

BRIEF DESCRIPTION OF THE DRAWINGS

Corresponding reference characters indicate corresponding parts throughout the several views of the drawings.

The exemplifications set out herein illustrate preferred embodiments of the invention in one form thereof, and such exemplifications are not to be construed as limiting in any manner.

DETAILED DESCRIPTION OF THE PREFERRED EMBODIMENTS

Figure 3:
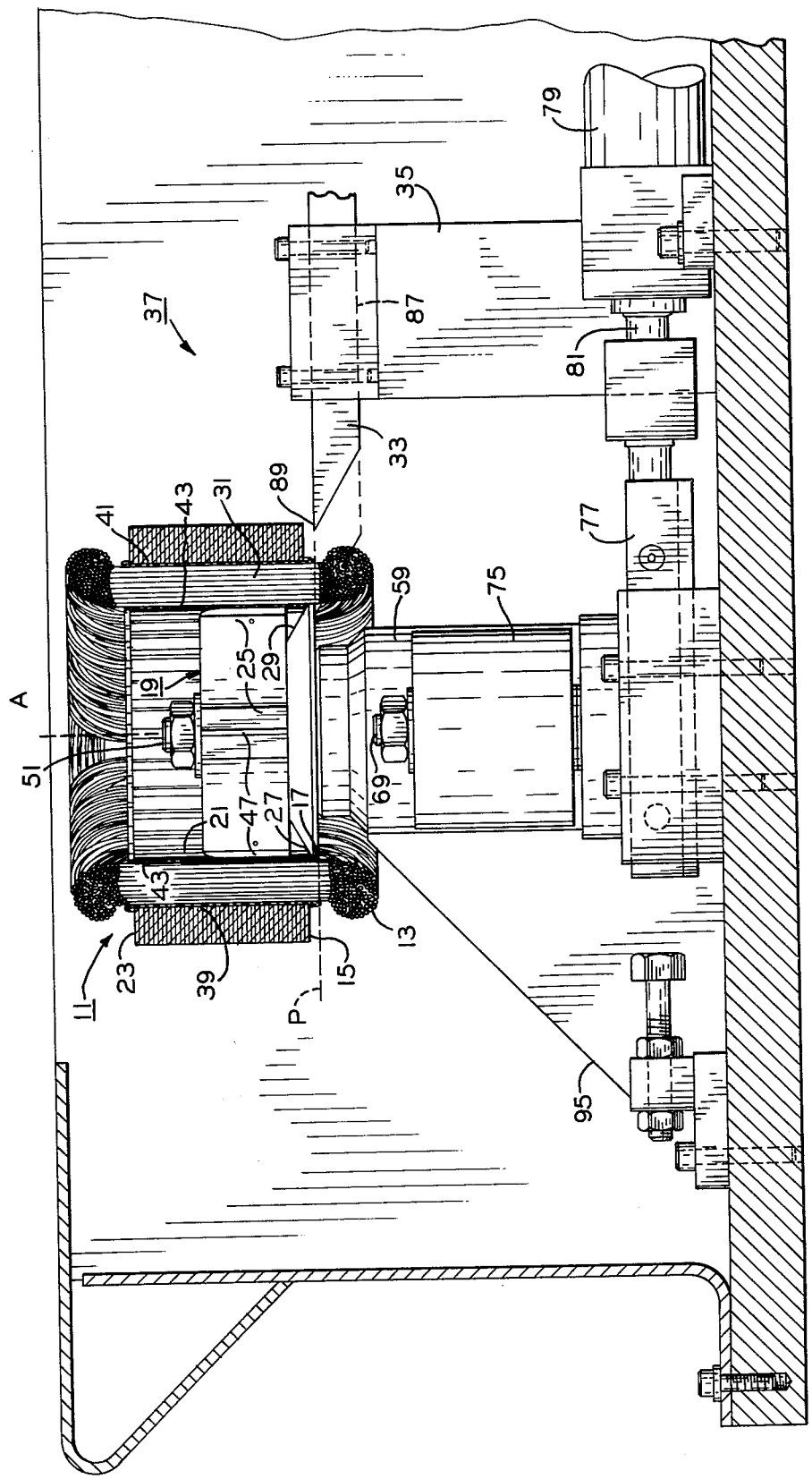
FIG. 3 is a partial elevational view of the apparatus of FIG. 1 showing a sectional stator assembled to means for mounting it and a predetermined plane in which means for severing the end turn is movable.

Referring now to the drawings in general, there is illustrated a method in one form of the invention for mounting a dynamoelectric machine stator 11 having a generally annular grouping of end turn windings or winding end turns 13 extending from an end face 15 of the stator with respect to a predetermined or severing plane P along which the winding end turns are adapted to be severed (FIG. 3). In this mounting method, means, such as a generally cylindric surface 17, for supporting engagement with winding end turns 13 is located adjacent predetermined plane P and generally normal thereto. Stator 11 is assembled to means, such as a mounting head or fixture 19, for mounting it wherein end face 15 is closely adjacent predetermined plane P and winding end turns 13 extend therethrough generally about the supporting means or supporting engagement means, such as cylindric surface 17, therefor.

More particularly and with specific reference to FIG. 3, stator 11 has a bore 21 extending therethrough generally about an axis A and generally normal or perpendicular to end face 15 and an opposite end face 23 of the stator. When stator 11 is assembled to mounting head 19, stator bore 21 is passed over means, such as a plurality of guide surfaces 25 on the mounting head, for guiding engagement with the stator bore so as to align the stator on axis A thereof generally normally with respect to plane P. As stator 11 is moved downwardly into its mounted or located position on mounting head 19, a circular shoulder or edge 27 defined generally at the juncture of bore 21 and end face 15, i.e. extending generally about the bore adjacent the end face, is seated upon means, such as a sloping or beveled surface 29 on the mounting means, for seating engagement with the stator. In this located or seated position, stator end face 15 is predeterminately spaced above plane P and winding end turns 13 extend therethrough thereby to be also predeterminately located and automatically aligned with respect to the plane. In the located position of stator 11 on mounting head 19, cylindric surface 17 is predeterminately interposed between plane P and stator end face 15 being generally normal or perpendicular to at least plane P, and the radially inner peripheral portion of winding end turns 13 encompasses or extends generally about the cylindric surface being at least closely radially adjacent thereto. It may be noted that in its located position, stator 11 is generally loosely mounted to mounting head 19, i.e. only the weight of the stator maintains it against vertical displacement from its located position in engagement on beveled surface 29. However, if desired, it is contemplated that means could be engaged with stator 11 to positively restrain it against vertical displacement from its located position within the scope of the invention.

Figure 1:
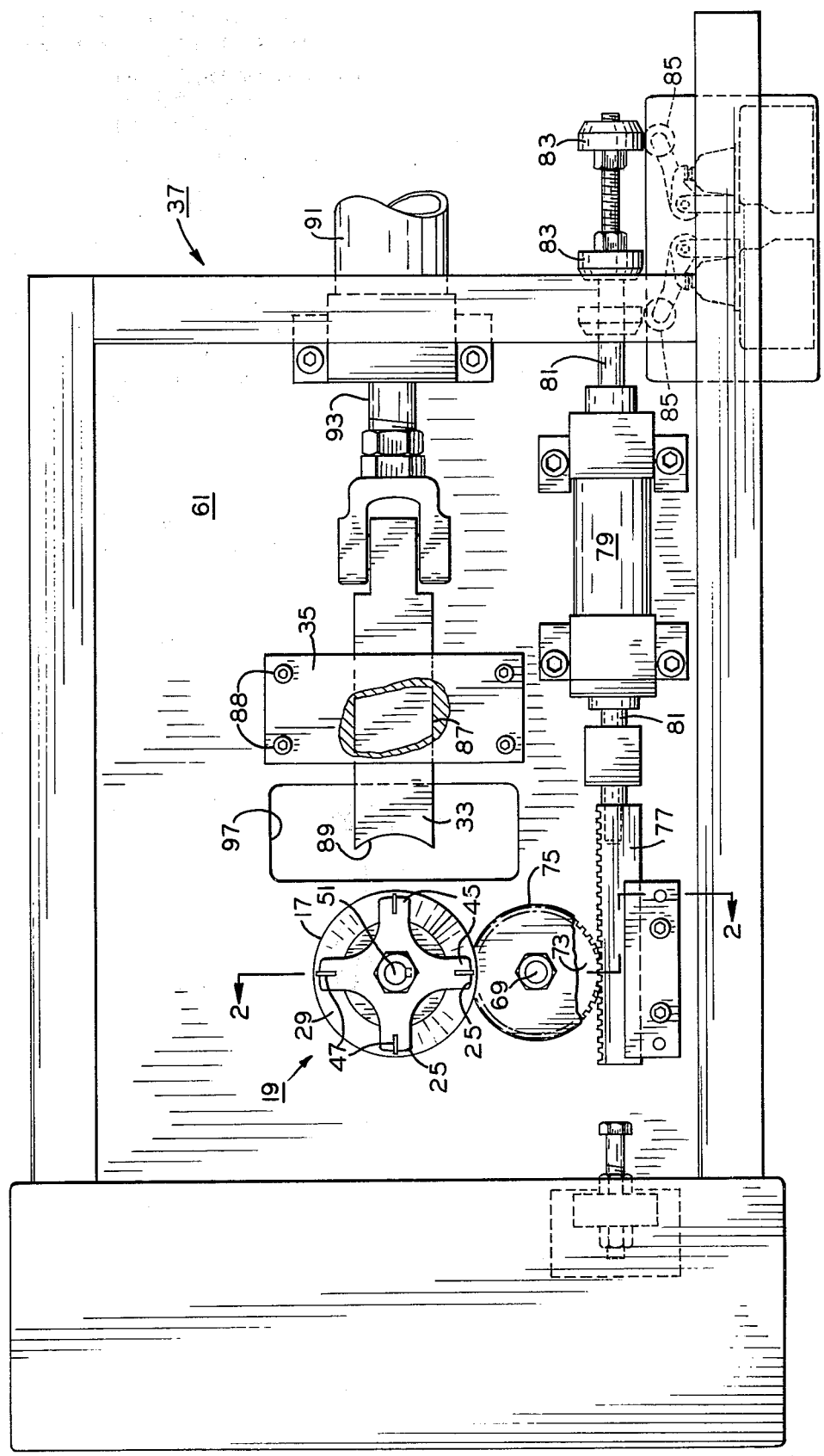
FIG. 1 is a plan view of apparatus in one form of the invention for severing an end turn from windings in a dynamoelectric machine stator and means in one form of the invention for mounting such stator which illustrate principles of methods also in one form of the invention which may be practiced to effect such severance of the end turns and such mounting of the stator, respectively.

Referring again to the drawings in general, there is also illustrated a method in one form of the invention for severing winding end turns 13 extending from end face 15 of stator 11, the winding end turns being formed by a plurality of windings, indicated generally at 31, wound in the stator (FIG. 3). In this severing method, stator 11 is assembled to mounting head 19 in the located position predeterminately disposing winding end turns 13 adjacent means, such as a cutting or severing bar 33, for severing them (FIGS. 1 and 3). Severing means or cutting bar 33 is then actuated into severing engagement with a portion of winding end turns 13 (as shown in dotted lines in FIG. 3) and severs it from windings 31 in stator 11. Thereafter, mounting head 19 with stator 11 assembled thereto is indexed toward successive indexed positions, and cutting bar 33 is actuated further to respectively sever other portions of winding end turns 13 in the successive indexed positions of the mounting head until the winding end turns are completely severed from windings 31 in the stator.

More particularly and with specific reference to FIG. 3, cylindric surface 17 is predeterminately located relative to cutting bar 33, i.e. relative to predetermined or severing plane P in which cutting bar 33 is reciprocally movable, for supporting winding end turns 13 adjacent the portions thereof adapted to be severed by the cutting bar in each of the indexed positions of mounting head 19. Further, beveled surface 29, on which stator 11 is seated in its located position, is also predeterminately located so that stator end face 15 is spaced adjacent cutting bar 33, i.e. out of interferring engagement therewith, upon the actuation of the cutting bar into severing engagement with winding end turns 13. In order to maintain the aforementioned predetermined locations of cylindric surface 17 and beveled surface 29 effective wherein end turns 13 are automatically aligned therewith and with cutting bar 33 when stator 11 is assembled to mounting head 19, means, such as a fixture 35 or the like also shown in FIG. 1, is provided for guiding and supporting engagement with the cutting bar for directing it in the plane P and generally normally or perpendicularly toward an axis of the mounting head which is generally coincidental with axis A of stator bore 21. In this manner, movement of cutting bar 33 in plane P toward severing engagement with winding end turns 13 is generally normal thereto, and cylindric surface 17 is predeterminately located closely adjacent and generally normal to plane P to support the winding end turns both closely adjacent the portions thereof severed by the cutting bar and closely adjacent stator end face 15 upon the actuation of the cutting bar.

Figure 2:
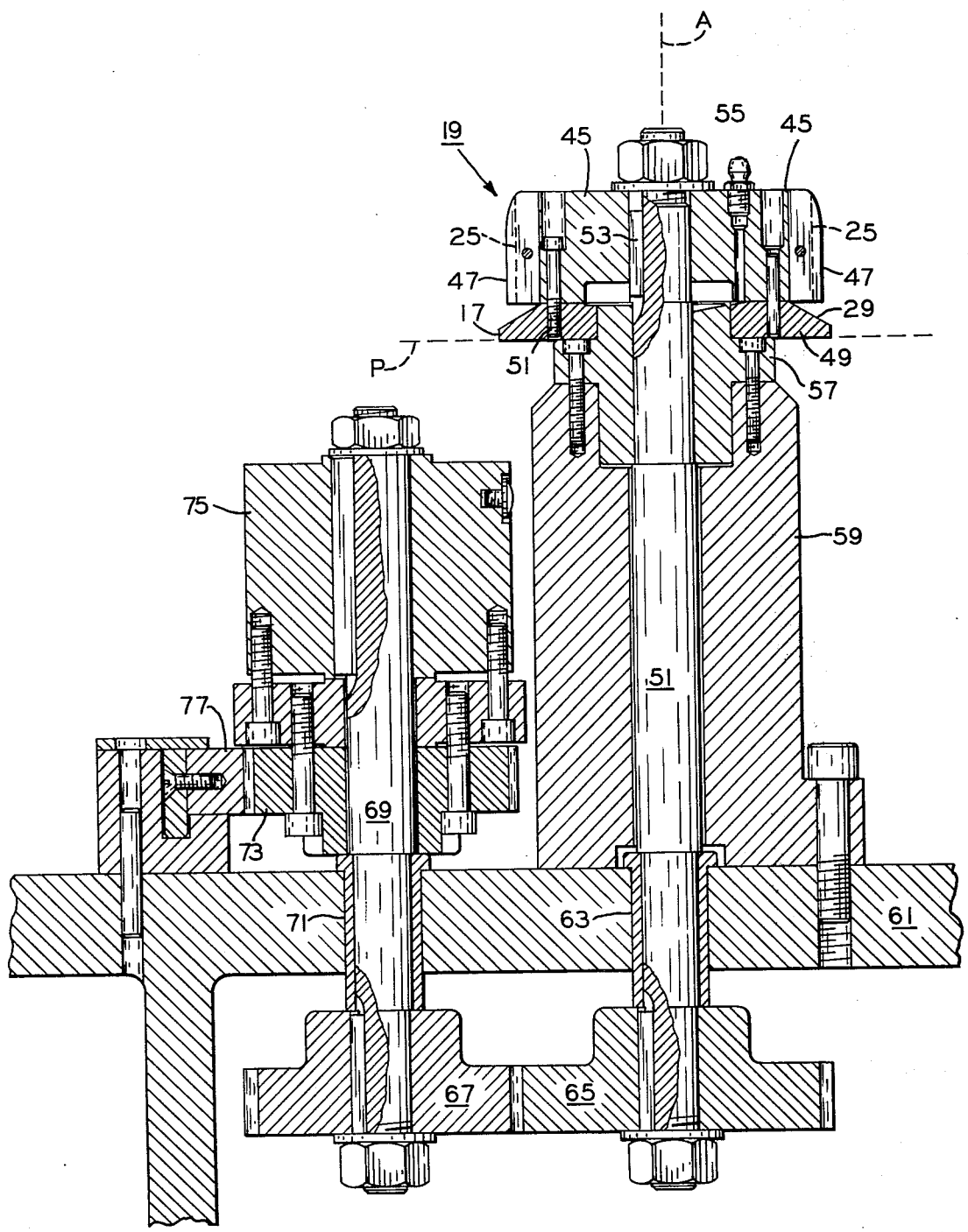
FIG. 2 is a sectional view taken generally along line 2—2 in FIG. 1.

Referring again in general to the drawings, an apparatus, indicated generally at 37, in one form of the invention is provided for severing the generally annular grouping of end turns 13 of windings 31 in stator 11 generally in plane P (FIGS. 1–3). In apparatus 37, means, such as mounting head 19, is provided for loosely mounting stator 11 upon the assembly thereof to the mounting head. Mounting head 19 includes means, such as beveled surface 29, for predeterminately locating stator 11 so that plane P passes through winding end turns 13 closely adjacent the stator and also means, such as cylindric surface 17, disposed between stator 11 and plane P generally normal thereto for supporting engagement with the winding end turns, as previously mentioned.

Further in general and recapitulating, at least in part, with respect to apparatus 37, the apparatus in one form of the invention has means, such as cutting bar 33, movable generally in predetermined plane P for severing at least a portion of winding end turns 13 from stator windings 31. Beveled surface 29 positions stator end face 15 generally adjacent plane P and cylindric surface 17 supports the winding end turns adjacent both the stator end face and plane P upon the severance of the winding end turns portion in response to the movement of severing means or cutting bar 33 into severing engagement therewith.

More particularly and with specific reference again to FIG. 3, stator 11 is provided with a plurality of winding receiving slots 39 which extend generally radially with respect to stator bore 21 and intersect both the stator bore and stator end faces 15, 23. If desired, slot liners 41 and slot wedges 43 of suitable insulating material may be disposed in stator slots 39, as well known in the art, and stator windings 31 are disposed in the stator slots so as to form at least two magnetic poles, as is also well known in the art. Stator windings 31 are generally constituted by a plurality of turns or coils of wire, such as copper, aluminum, or alloys thereof or the like, which may, if desired, have an insulating coating thereon, as well-known to the art. The plurality of coils constituting stator windings 31 have opposite sides which are received within stator slots 39, and opposite end turns 13 are integral with the opposite sides being formed into the aforementioned generally annular groupings of end turns adjacent stator end faces 15, 23 and spanning between a preselected number of stator slots 39 thereby to form with stator 11 the aforementioned magnetic poles.

Mounting means or mounting head 19 is provided with a plurality of generally radially extending flanges 45, FIG. 1, having free ends constituting guide surfaces 25 for the sliding and guiding engagement with stator bore 21 upon the assembly of stator 11 to the mounting head by an apparatus operator, as previously mentioned. A plurality of flutes or guide fingers 47 are disposed in flanges 45 extending generally radially therefrom and generally longitudinally with respect to guide surfaces 25 for sliding and guiding engagement between adjacent, opposite, inner end portions of stator slots 39 thereby to predeterminately limit rotational displacement movement of stator 11 from its located position when assembled to mounting head 19 in seating or locating engagement with beveled surface 29 thereof. Cylindric surface 17 and beveled surface 29 are provided on an annular plate 49 which constitutes a portion of mounting head 19 and which is fixedly attached to flanges 45 by suitable means such as a plurality of screws 51, FIG. 2.

Means, such as a shaft 51, is provided for rotatably indexing mounting head 19 to align successive portions of winding end turns 13 with cutting bar 33 for severing engagement therewith in each successive indexed position of the mounting head with stator 11 assembled thereto, as discussed in greater detail hereinafter. The vertical axis of shaft 51 is generally coincidental with that of mounting head 19. Shaft or indexing means 51 has its upper end keyed at 53 with mounting head 19 for conjoint indexing rotation, and a nut and lock washer assembly 55 is received on the upper end of the shaft in displacement preventing engagement with the mounting head. Annular plate 49 of mounting head 19 is journalled in bearing engagement with a bearing 57 fixedly positioned by suitable means atop a support 59 therefore which is mounted by suitable means to a base or frame or the like 61 for apparatus 37. Shaft 51 extends through support 59, and the upper end of the shaft adjacent mounting head 19 is rotatably journaled by bearing 57 while the lower end of the shaft extends through apparatus base 61 being also rotatably journaled in another bearing 63 disposed in the apparatus base. A pinion gear 65 is fixedly received on the lower free end of shaft 51 beneath apparatus base 61 and is meshed in engagement with another pinion gear 67. Pinion gear 67 is carried by another shaft 69 rotatably journaled in another bearing 71 disposed in the apparatus base, and shaft 69 is disposed adjacent shaft 51 and generally parallel therewith.

Another pinion gear 73 and an associated clutch device 75 is fixedly connected to shaft 69 adjacent and above apparatus base 61 opposite gear 67, and a rack or rack gear 77 is slidably and guidably mounted for reciprocal intermittent movement by suitable means on apparatus base 61 and drivingly engaged with gear 73, as also shown in FIG. 1. An air motor 79, of a type well-known in the art, is provided with a reciprocal drive shaft 81 drivingly connected with rack 77 to effect the reciprocal intermittent movement thereof, and a pair of adjustably spaced abutments 83 are carried on a rearward extension of air motor shaft 81 for positioning engagement with a pair of limit switches 85. The respective engagements of spaced abutments 83 on air motor shaft 81 with limit switches 85 serve to define the fully protracted and retracted positions of the reciprocal movement of rack 77 in response to its actuation by air motor 79. Although not shown for the purpose of brevity, air motor 79 may be electronically associated with a counter and valving well-known to the art which are operable generally to successively and intermittently supply air to the air motor thereby to effect successive intermittent advances of rack 77 through its protractive stroke or portion of its reciprocal movement. In this manner, the intermittent protractive advance of rack 77 effects the conjoint driven rotation of gears 67, 73 on shaft 69 through the driving engagement of rack 77 with gear 73, and the meshing engagement of gears 65, 67 thereby effects the indexing rotation of shaft 51 to conjointly move or rotate mounting head 17 from its original or at-rest position through a plurality of successive, intermittent indexed positions.

As shown in FIG. 1, cutting bar 33 is slidably and guidably mounted for reciprocal movement in a groove or slideway 87 provided therefor in fixture 35, and the fixture is attached by a plurality of screws 88 to apparatus base 61. Fixture 35 is disposed or arranged on apparatus base 61 proximate to shaft 51 so that the path of the reciprocal movement of cutting bar 33 is directed toward axis A of mounting head 19, i.e. toward the axis of shaft 51. Further, cutting bar 33 is provided with an arcuate cutting edge 89 for severing or cutting engagement with winding end turns 13 in the protracted positions of the cutting bar, as illustrated in dotted lines in FIG. 3, and the extent of the arc of the cutting edge is such as to only sever a portion of the winding end turns in each indexed position of mounting head 19. Fixture 35 is also arranged on apparatus base 61 in such a manner that the sliding and guiding engagement between cutting bar 33 with its slideway 87 in the fixture maintains cutting edge 89 generally in plane P upon the reciprocal movement of the cutting bar. From the foregoing, it may be noted that plane P is predetermined generally defining the reciprocal movement of cutting edge 89 on cutting bar 33 toward severing engagement with winding end turns and generally normal to axis A of mounting head 19 and stator 11. To complete the description of apparatus 37, another air motor 91 has a reciprocable shaft 93 which is drivingly linked with cutting bar 33, and the air motor may be actuated by means well known to the art (not shown) for protractively moving the cutting bar into severing engagement with the winding end turns 13 of stator 11 in each indexed position of mounting head 19 and then retracting the cutting bar to its at-rest position.

OPERATION

With the components of apparatus 37 in their respective at-rest positions as described hereinabove and as shown in the drawings, an operator for such apparatus may load it by disposing bore 21 of a stator 11 in sliding and guiding engagement with guide surface 25 of flanges 45 on mounting head 19 with the flutes 47 thereof interposed between adjacent, opposite, radially inner end portions of stator slots 39, as shown in FIG. 3. When so arranged on mounting head 19, stator 11 may be moved downwardly by the operator until stator shoulder 27 seats upon beveled surface 29 of the mounting head. It may be noted that the guiding engagement of stator bore 21 with guide surfaces 25 of mounting head 19 aligns stator axis A generally coincidentally with the axis of the mounting head and shaft 51 generally normal or perpendicular to plane P. As a result, when stator 11 is disposed in its located position in seating engagement with beveled surface 29 of mounting head 19, the stator is automatically aligned generally normal to plane P and with respect to cutting bar 33. Of course, in the located position of stator 11, end face 15 is spaced closely adjacent plane P and generally parallel thereto while winding end turns 13 are passed through the plane P and also positioned predeterminately relative thereto. It may also be noted that in the located position of stator 11, cylindric surface 17 of mounting head 19 is disposed between plane P and stator end face 15 and also at least closely adjacent the radially inner peripheral portion of winding end turns 13, and axis A of stator 11 and mounting head 19 are generally coincidental or in alignment.

At this time, the operator may initiate the generally automatic operation of apparatus 37 wherein air motor 91, FIG. 1, is actuated to drive cutting bar 33 from its at-rest position leftwardly (as seen in FIG. 3) toward its displaced or cutting position, as shown in dotted lines in FIG. 3. The driving actuation of cutter bar 33 moves its cutting edge 89 generally along plane P into severing engagement with a portion of winding end turns 13 thereby to sever such portion from stator windings 31. In response to the severing engagement between cutting edge 89 of cutting bar 33 with the aforementioned severed portion thereof, winding end turns 13 are generally urged toward abutting engagement with cylindric surface 17 of mounting head 19. In this manner, cylindric surface 17 acts as a back-up or abutment for the severing operation effected by apparatus 37 serving to support winding end turns 13 both closely adjacent plane P and stator end face 15 at least generally in the area of the aforementioned severed portion of the winding end turns. Of course, upon attaining its leftwardly displaced position, cutting bar 33 is reciprocally retracted to its at-rest position by air motor 91.

At this time, the electronic counter and air valving (not shown) for timing and effecting the indexing operation of apparatus 37 is operable, as previously mentioned, to effect actuation of air motor 79 to intermittently advance rack 77 in its protractile movement leftwardly (as best seen in FIG. 1). This predetermined advance of rack 77 drives or rotates gear 73 meshed therewith, as shown in FIG. 2, and effects conjoint rotation of shaft 69 and pinion gear 67 with gear 73, and the meshing engagement of pinion gears 65, 67 effects conjoint rotation of shaft 51 and mounting head 19 to a successive indexed position. In the successive indexed position of mounting head 19, stator 11 is disposed so that another or successive portion of winding end turns 13 is positioned or disposed for severing engagement with cutting bar 33 upon further actuation thereof, as previously described. In this manner, the intermittent indexing advance movement of rack 77 effects conjoint indexing or rotational movement of mounting head 19 to successive indexing positions so that successive portions of winding end turns 13 may be severed by actuation of cutting bar 33. Of course, the number of successive indexing movements of rack 77 and mounting head 19 and the extent of such indexing movements to successive indexed positions may be preselected. In each successive indexed position of mounting head 19, a successive portion of winding end turns 13 is severed from stator windings 31 by cutting bar 33, and when the mounting head has been so indexed between indexed positions through at least one complete revolution, i.e. at least 360°, the entire winding end turn will have been severed from the stator winding.

Upon the complete severance of winding end turns 13, it will fall away from stator windings 31 onto means, such as a plurality of flanges 95 shown in FIG. 3, for catching the completely severed winding end turn, and the flanges 95 are mounted to apparatus base 61. The electronic counter and air valving (not shown) are now effective to actuate air motor 79 to retractively move rack 77 rightwardly (as best seen in FIG. 1) from its protractile advanced position toward its retracted or at-rest position, and such retractile movement of the rack re-rotates mounting head 19 to its original or at-rest position through gear 73, shaft 69, pinion gears 65, 67 and shaft 51, as previously described.

With the components of apparatus 37 now returned to their respective at-rest positions, as described above, the apparatus operator may now remove stator 11 from mounting head 19. Usually, the completely severed winding end turn 13 will break apart as it falls upon the catching flanges 95 and may be swept by the operator through an opening 97 in base 61 for disposal exteriorly of apparatus 37. Of course, another stator 11 may now be mounted by the apparatus operator to mounting head 19 to sever its winding end turns 13 upon a subsequent indexing cycle of apparatus 37, as previously described.

From the foregoing, it is apparent that a novel apparatus 37 and method for severing winding end turns and a novel mounting head 19 are provided meeting all of the objects and advantageous features set out hereinbefore, as well as others, and that the arrangements, shapes and details of parts for the apparatus and mounting head as well as variations in the steps of the method may be made by those having ordinary skill in the art without departing from the spirit of the invention and the scope thereof, as set out by the claims which follow.

What we claim as new and desire to secure by Letters Patent of the United States is:

1. Apparatus for severing from a plurality of windings in a dynamoelectric machine stator a generally annular grouping of winding end turns extending from an end face of the stator comprising means movable generally in a predetermined plane for severing at least a portion of the winding end turns from the stator windings, and means for mounting the stator including means for positioning the end face generally adjacent the predetermined plane, and means for supporting the winding end turns adjacent the end face and the plane upon the severance of the winding end turn portion in response to the movement of the severing means into severing engagement therewith.

2. Apparatus as set forth in claim 1, further comprising means for rotatably indexing the mounting means to align a successive portion of the winding end turns with the severing means for severing engagement therewith.

3. Apparatus as set forth in claim 1, further comprising means for driving the severing means to effect the movement thereof into the severing engagement with the winding end turns portion.

4. Apparatus as set forth in claim 3, further comprising means for retracting the severing means toward an at-rest position displaced from the winding end turns upon the severance of the winding end turns portion.

5. Apparatus as set forth in claim 1, further comprising means for guiding and supporting the severing means to effect its movement generally in the predetermined plane.

6. Apparatus as set forth in claim 1, wherein the extent of the winding end turns portion is constituted by a preselected arc generally about the periphery of the end turn, and further comprising means for indexing the mounting means through successive rotations generally defined by the preselected arc thereby to successively align other portions of the winding end turns with the severing means for severance thereby.

7. Apparatus as set forth in claim 1, wherein the positioning means includes means for guiding engagement with the stator so as to align it generally normally with respect to the predetermined plane.

8. Apparatus as set forth in claim 1, wherein the positioning means includes means for seating engagement with the stator adjacent the end face wherein the end face is predeterminately spaced from the predetermined plane.

9. Apparatus as set forth in claim 1, wherein the positioning means includes means for seating engagement with the stator wherein the winding end turns are predeterminately located relative to the predetermined plane.

10. Apparatus as set forth in claim 1, wherein the positioning means includes means for seating engagement with the stator wherein the end face is predeterminately spaced from the predetermined plane and the winding end turns extends therethrough thereby to locate the winding end turns relative to the predetermined plane.

11. Apparatus as set forth in claim 1, wherein the supporting means includes means for abutting engagement with the winding end turns at least adjacent the winding end turns portion, the winding end turns being urged toward abutment with the abutting engagement means in response to the severing engagement of the severing means with the winding end turns portion.

12. Apparatus as set forth in claim 1, wherein the supporting means includes a generally cylindric surface adapted to be spaced adjacent the winding end turns between the predetermined plane and the end face of the stator when it is mounted to the mounting means, the severing engagement of the severing means with the winding end turns portion at least urging the winding end turns adjacent thereto toward engagement with the cylindric surface.

13. Apparatus for severing from a plurality of windings disposed within a dynamoelectric machine stator generally about a bore thereof a generally annular grouping of winding end turns extending from an end face of the stator comprising means reciprocally movable generally in a predetermined plane for severing the winding end turns from the windings, and means for mounting the stator adapted for assembly therewith proximate the severing means including means for aligning the stator wherein the end face is generally parallel to the predetermined plane, means for positioning the end face generally adjacent the predetermined plane, and means for supporting the winding end turns disposed generally normally to the predetermined plane between it and the end face, at least a portion of the winding end turns being urged toward engagement with the supporting means in response to the severing engagement of the severing means with the winding end turns portion upon the reciprocal movement in one direction of the severing means from an at-rest position thereof generally toward the axis of the stator bore.

14. Apparatus as set forth in claim 13, wherein the aligning means includes means for guiding engagement with the stator bore thereby to dispose the stator generally normally with respect to the predetermined plane.

15. Apparatus as set forth in claim 14, wherein the guiding means is constituted by a plurality of generally radially extending flanges.

16. Apparatus as set forth in claim 13, wherein the positioning means includes means for seating engagement with the stator generally about the bore thereof at least adjacent the end face.

17. Apparatus as set forth in claim 16, wherein the seating means is constituted by a sloping generally annular surface.

18. Apparatus as set forth in claim 13, wherein the supporting means includes a generally cylindric surface.

19. Apparatus as set forth in claim 13, further comprising means for rotatably indexing the mounting means to align at least another successive portion of the winding end turns with the severing means for severing engagement therewith.

20. Apparatus as set forth in claim 13, wherein the severing means includes an arcuate cutting edge for severing engagement with the winding end turns portion.

21. Apparatus as set forth in claim 13, further comprising means for driving the severing means to effect the movement thereof into the severing engagement with the winding end turns portion.

22. Apparatus as set forth in claim 13, further comprising means for guiding and supporting engagement with the severing means to maintain its movement generally in the predetermined plane and directed toward the axis of the stator bore.

23. Apparatus as set forth in claim 13, wherein the severing means includes a generally arcuate cutting edge for severing engagement with the winding end turns, the arcuate cutting edge extending only a preselected angle of arc, and further comprising means for indexing the mounting means between successive indexed positions generally defined by the preselected angle of arc thereby to align other portions of the winding end turns with the severing means for severance thereby in each of the indexed positions of the mounting means.

24. Apparatus for severing from a plurality of windings disposed generally about a bore of a dynamoelectric machine stator a generally annular grouping of end turns of the windings extending exteriorly of the stator from an end face thereof comprising a base, a fixture mounted to the base, a cutter bar reciprocally movable in the fixture and having a generally arcuate cutting edge, means in the fixture for guiding engagement with the cutter bar to maintain the path of the reciprocal movement thereof generally in a predetermined plane, a pair of parallel spaced apart shafts rotatably mounted to the base, one of the shafts being disposed proximate to the cutter bar on an axis intercepting the path of the reciprocal movement of the cutter and extending generally normally to the predetermined plane, a pair of gears mounted to the shafts in meshing engagement therebetween, a third gear mounted to the other of the shafts, a rack meshed with the third gear, means for intermittently advancing the rack to conjointly drive the third gear, the other shaft and the gear pair for effecting intermittent rotation of the one shaft between a plurality of intermittent indexed positions, means for mounting the stator when manually assembled thereto, the mounting means being carried on the one shaft and adapted for concerted rotation therewith between its indexing positions, the mounting means including a mounting head having a plurality of generally radially extending flanges with free end surfaces for guiding engagement with portions of the stator within the bore thereof to position the stator end face generally parallel with the predetermined plane, and a support for seating the stator on the mounting means, the support including a sloped generally annular surface for positioning the stator end face generally adjacent the predetermined plane and for engagement with the stator about the bore thereof at least adjacent the end face, and a generally cylindric abutment surface for supporting engagement with the end turns and extending generally normally to the predetermined plane between it and the stator end face, at least a portion of the end turns being urged toward engagement with the abutment surface in response to the severing engagement of the cutting edge with the end turns portion upon the reciprocal movement in one direction of the cutter bar from an at-rest position generally toward the axis of the one shaft when it is in each of its indexed positions.

25. A method of severing a winding end turn extending from an end face of a dynamoelectric machine stator and formed by a plurality of windings wound in the stator comprising the steps of:
 a. assembling the stator to means for mounting it in a position predeterminately disposing the winding end turn adjacent means for severing the winding end turn;
 b. actuating the severing means into severing engagement with a portion of the winding end turn and severing the winding end turn portion from the windings in the stator; and
 c. indexing the mounting means with the stator assembled thereto toward successive indexed positions and actuating further the severing means to respectively sever other portions of the winding end turn in the successive indexed positions of the mounting means and stator until the winding end turn is severed from the windings in the stator.

26. The method as set forth in claim 25, wherein the assembly step comprises seating the stator on the mounting means wherein the winding end turns are automatically aligned relative to the severing means.

27. The method as set forth in claim 25, comprising the preliminary step of predeterminately locating relative to the severing means means for supporting the winding end turns adjacent the first named portion thereof and the other portions thereof adapted for severance during the actuating and severing step and the indexing and actuating step, respectively.

28. The method as set forth in claim 25, comprising the preliminary step of predeterminately locating relative to the severing means means for seating the stator during the assembly step so that the stator end face is spaced adjacent the severing means upon the actuation thereof during the actuating and severing step and the indexing and actuating step, respectively.

29. The method as set forth in claim 25, comprising the preliminary step of directing the severing means generally normally toward an axis of the mounting means about which it is indexed.

30. The method as set forth in claim 25, comprising the additional step of catching the winding end turn upon the severance thereof from the windings in the stator.

31. The method as set forth in claim 25, comprising the preliminary step of disposing the mounting means on a rotatable shaft proximate the severing means so as to be rotated between the indexed positions thereof during the indexing and actuating step.

32. In apparatus for severing a generally annular grouping of end turns of windings in a dynamoelectric machine stator generally in a predetermined severing plane; means for mounting the stator upon the assembly thereof to the mounting means including means for predeterminately locating the stator so that the predetermined severing plane passes through the winding end turns closely adjacent the stator, and means disposed between the stator and the predetermined severing plane and generally normal thereto for supporting engagement with the winding end turns.

33. In the apparatus as set forth in claim 32, wherein the stator includes an end face from which the winding end turns extend, and said locating means including means for positioning engagement with the stator wherein the end face is generally parallel to the predetermined severing plane and adjacent thereto.

34. In the apparatus as set forth in claim 32, wherein the stator includes a bore extending generally axially therethrough, and said locating means including means for engagement with the stator within the bore thereof so that the bore axis is generally normal to the predetermined severing plane.

35. In the apparatus as set forth in claim 32, wherein the stator includes an end face from which the winding end turns extend, and a bore extending generally axially through the stator and intersecting with the end face, said loating means including means for positioning engagement with the stator generally about the bore thereof adjacent the end face to dispose the end face generally parallel to the predetermined severing plane and adjacent thereto, and means for engagement with the stator within the bore thereof so that the bore axis is generally normal to the predetermined severing plane.

36. In the apparatus as set forth in claim 32, wherein said supporting engagement means includes a generally cylindric surface adapted to be disposed closely adjacent the inner periphery of the winding end turns when the stator is loosely mounted to the mounting means.

37. A method of mounting a dynamoelectric machine stator having a generally annular grouping of end turn windings extending from an end face thereof with respect to a predetermined plane along which the end turn windings are adapted to be severed comprising the steps of:
   a. locating means for supporting engagement with the end turn windings adjacent the predetermined plane and generally normal thereto; and
   b. assembling the stator to means for mounting it wherein the end face is closely adjacent the predetermined plane and the end turn windings extend therethrough generally about the supporting engagement means therefor.

38. A method of mounting a dynamoelectric machine stator having a generally annular grouping of end turn windings with respect to a predetermined plane along which the end turn windings are adapted to be severed, said method comprising assembling the stator to means for mounting it with the winding end turns extending through the predetermined plane and generally about means on the mounting means disposed adjacent the predetermined plane for abutting engagement with at least a portion of the winding end turns.

39. A method of mounting a dynamoelectric machine stator having a generally annular grouping of end turn windings with respect to a predetermined plane along which the end turn windings are adapted to be severed, the end turn windings having an inner peripheral portion extending generally axially from an end face of the stator, said method comprising assembling the stator to means for mounting it so that the end turn windings pass through the predetermined plane with the inner peripheral portion of the end turn windings generally encompassing a part of the mounting means disposed adjacent the predetermined plane for abutting engagement with at least a part of the inner peripheral portion of the end turn windings.

* * * * *